United States Patent [19]

Schmidt et al.

[11] Patent Number: 5,073,337
[45] Date of Patent: Dec. 17, 1991

[54] RARE EARTH/IRON FLUORIDE AND METHODS FOR MAKING AND USING SAME

[75] Inventors: Frederick A. Schmidt, Ames; John T. Wheelock, Neveda; David T. Peterson, Ames, all of Iowa

[73] Assignee: Iowa State University Research Foundation, Inc., Ames, Iowa

[21] Appl. No.: 554,189

[22] Filed: Jul. 17, 1990

[51] Int. Cl.[5] ............................................. C22C 33/00
[52] U.S. Cl. .................................. 420/83; 420/416; 423/250; 423/471
[58] Field of Search ............... 420/83, 416; 423/250, 423/471; 75/610

[56] References Cited

U.S. PATENT DOCUMENTS

| | | | |
|---|---|---|---|
| 3,625,779 | 12/1971 | Cech | 75/610 |
| 3,821,356 | 6/1974 | Baldwin | 423/250 |
| 4,612,047 | 9/1986 | Schmidt et al. | 420/83 |
| 4,636,353 | 1/1987 | Seon et al. | 420/416 |
| 4,741,893 | 5/1988 | Watanabe et al. | 423/471 |
| 4,770,702 | 5/1988 | Ishigaki | 75/244 |

OTHER PUBLICATIONS

Recovery of Rare Earth elements from Rare Earth Element-Iron Type Magnetic Alloy—Chemical Abstracts 108:115079y.
Treatise on Analytical Chemistry, vol. 8, 1963, p. 17.
Chemical Abstracts—Recovery of Rare Earth Metals from Iron-Alloy Scrap.
Chemical Abstracts 101:212317g, Khim. Tekhnol, 1984.
The Handbook on the Physics and Chemistry of Rare Earths, 1978.
Chemical Abstract 108:82900d-"Phase Diagram of Iron Di-Fluoride-Lanthanide Tri-Fluoride Systems", 1987.

*Primary Examiner*—Peter D. Rosenberg
*Attorney, Agent, or Firm*—Tilton, Fallon, Lungmus & Chestnut

[57] ABSTRACT

A particulate mixture of $Fe_2O_3$ and $RE_2O_3$, where RE is a rare earth element, is reacted with an excess of HF acid to form an insoluble fluoride compound (salt) comprising $REF_3$ and $FeF_3$ present in solid solution in the $REF_3$ crystal lattice. The $REF_3/FeF_3$ compound is dried to render it usable as a reactant in the thermite reduction process as well as other processes which require an $REF_3/FeF_3$ mixture. The dried $REF_3/FeF_3$ compound comprises about 5 weight % to about 40 weight % of $FeF_3$ and the balance $REF_3$ to this end.

22 Claims, 8 Drawing Sheets

RARE EARTH/IRON FLUORIDE AND METHODS FOR MAKING AND USING SAME

CONTRACTUAL ORIGIN OF THE INVENTION

The United States Government has rights in this invention pursuant to Contract No. W-7405-ENG-82 between the U.S. Department of Energy and Iowa State University, Ames, Iowa, which contract grants to the Iowa State University Research Foundation, Inc. the right to apply for this patent.

FIELD OF THE INVENTION

The present invention relates to a rare earth/iron fluoride compound useful as a reactant in the thermite reduction process and other metallothermic processes and to a method of making the rare earth/iron fluoride compound.

BACKGROUND OF THE INVENTION

The thermite reduction process described in the Schmidt et al. U.S. Pat. No. 4,612,047 is useful in the production of rare earth/iron alloys from which high performance permanent magnet alloys (e.g. $Nd_2Fe_{14}B$) are in turn made. The thermite reduction process involves preparing a mixture of a rare earth fluoride, iron fluoride and calcium metal, heating this mixture under reducing conditions to a temperature sufficient to react the fluorides with the calcium metal to form a rare earth/iron alloy and a calcium fluoride slag, and then separating the alloy from the slag.

The rare earth fluoride (e.g., $NdF_3$) used as one reactant in the thermite reduction process is typically prepared by wet or dry hydrofluorination of the corresponding trivalent rare earth oxide (e.g., $Nd_2O_3$) The iron fluoride (e.g. $FeF_3$) employed as another reactant (thermal booster) in the thermite reduction process is typically prepared by dry hydrofluorination of relatively expensive ferric chloride ($FeCl_3$) or by wet hydrofluorination from a concentrated ferric chloride solution. Attempts have been made to reduce the cost of the iron fluoride reactant by dry hydrofluorination of ferric oxide ($Fe_2O_3$) which is much less expensive than ferric chloride. Although various attempts have been made to dry hydrofluorinate $Fe_2O_3$ at temperatures up to about 600° C., none has been successful in producing iron fluoride acceptable for use in the thermite reduction process.

There nevertheless remains a continuing desire to reduce the cost of the iron fluoride reactant as a means of reducing the cost of the thermite reduction process. Moreover, any reduction in the number of individual reactants required to carry out the thermite reduction process and/or the number of processing steps required to make the rare earth fluoride and iron fluoride reactants for that process would be desirable for the same reason.

An object of the present invention is to provide a new, lower cost, wet process of making a rare earth/iron fluoride compound useful as a reactant in the thermite reduction process.

Another object of the invention is to provide a novel "solid solution" rare earth/iron fluoride compound that is useful as a reactant in the thermite reduction process in lieu of the separate rare earth fluoride reactant and iron fluoride reactant heretofore employed.

SUMMARY OF THE INVENTION

The invention envisions a new wet (aqueous) method for preparing a novel rare earth/iron fluoride compound useful as a reactant in the thermite reduction process as well as other metallothermic processes. In accordance with the method of the invention, a particulate mixture of $Fe_2O_3$ and $RE_2O_3$ (where RE is a rare earth element) in selected proportions is prepared and reacted with HF acid present in an amount exceeding the stoichiometric amount needed to fluorinate the $Fe_2O_3$ and $RE_2O_3$. The HF acid is present in an excess amount effective to yield a novel rare earth/iron fluoride compound comprised of $FeF_3$ present in solid solution in the crystal lattice of $REF_3$ (as indicated, for example, by an X-ray diffraction pattern of the compound in dried form). The novel rare earth/iron fluoride compound is formed as an insoluble, hydrated fluoride salt which is then subjected to a suitable drying treatment.

The dried rare earth/iron fluoride ($REF_3/FeF_3$) compound is useful as a low cost reactant in the thermite reduction process. To this end, the dried compound preferably comprises about 5 weight % to about 40 weight % $FeF_3$ in solid solution in the $REF_3$.

DETAILED DESCRIPTION OF THE INVENTION

Figure 1:
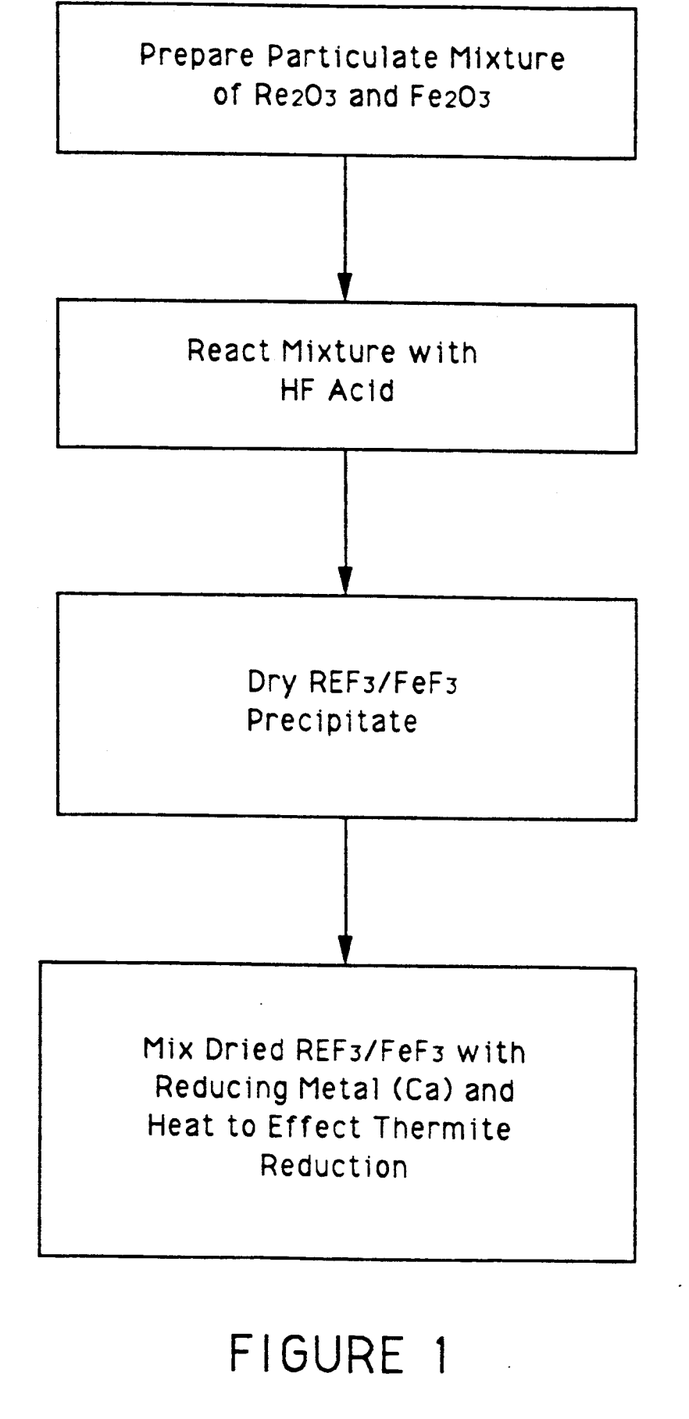
FIG. 1 is a flow diagram illustrating method steps for making the rare earth/iron fluoride compound in accordance with the invention.

Referring to FIG. 1, the various steps involved in practicing one embodiment of the method of the invention are illustrated. In particular, particulates of $Fe_2O_3$ and $RE_2O_3$, where RE is a rare earth element such as Nd, Dy, Gd, Ho, Er, Lu, La, Sc, and Y, are initially mechanically mixed in selected proportions to provide a starting particulate mixture. The $Fe_2O_3$ particulates are employed in a size range of about −10 to about −30 mesh and are commercially available from several chemical suppliers, such as Pfizer Minerals, Pigments & Metals Division, 235 E. 42nd St., New York, N.Y. 10017 and J. T. Baker, Inc., 222 Red School Lane, Phillipsburg, N.J. 08865. The $RE_2O_3$ particulates are used in a size range of about −10 to about −30 mesh and are commercially available from various rare earth oxide suppliers such as Molycorp Inc., 709 Westchester Avenue, White Plains, N.Y. 10604, Research Chemicals Co., P.O. Box 14588, Department R, Phoenix, Ariz. 85063 and Sausville Chemical Co., 176 Saddle River Avenue, Garfield, N.J. 07026.

In general, the $RE_2O_3$ particulates useful in practicing the invention are selected from the trivalent lanthanide rare earth oxides (e.g., $La_2O_3$, $Nd_2O_3$, $Dy_2O_3$, $Gd_2O_3$, $Ho_2O_3$, $Er_2O_3$, $Lu_2O_3$, $Sc_2O_3$ and $Y_2O_3$, all of which yield insoluble trivalent rare earth fluoride compounds when fluorinated in an HF acid solution in accordance with the invention. The mixed valance rare earth oxides such as $Tb_4O_7$, $Pr_6O_{11}$, $Ce_4O_7$, etc. may yield soluble fluoride compounds when fluorinated in an HF acid solution in accordance with the invention and may not be appropriate for use herein without prior processing of the solutions of these materials.

As will become apparent below, the $Fe_2O_3$ particulates and the $RE_2O_3$ particulates are mixed in proportions selected to produce upon hydrofluorination in accordance with the invention an insoluble rare earth/iron fluoride compound usable as a reactant in the thermite reduction process and other metallothermic processes. To this end, the starting particulate mixture generally will comprise about 5 weight % to about 40 weight % $Fe_2O_3$ and the balance $RE_2O_3$. A preferred starting particulate mixture comprises about 13 weight % to about 30 weight % $Fe_2O_3$ and the balance $RE_2O_3$. The $Fe_2O_3$ and $RE_2O_3$ particulates in the selected proportions are placed in a conventional V-type mixer and intimately mixed/blended to obtain a uniform distribution of the particulates throughout.

The starting $Fe_2O_3/RE_2O_3$ particulate mixture is then placed in a suitable reaction vessel or container (e.g. in a polyethlylene, Teflon, or other plastic or plastic coated container) and reacted with an excess amount of HF acid solution added to the vessel to fluorinate the oxides. The HF acid solution may be added to the vessel as a single charge or, preferably, as a plurality of successive smaller incremental charges. The vessel contents are stirred to form a slurry of the $RE_2O_3/Fe_2O_3$ particulates and the HF acid solution.

The HF acid is added in excess of the stoichiometric amount needed to fluorinate the $RE_2O_3$ and $Fe_2O_3$. In particular, the HF acid is added in an excess amount effective to produce the hydrofluorination reaction in accordance with the equation:

$$RE_2O_3/Fe_2O_3 + 6HF \rightarrow REF_3/FeF_3 \cdot xH_2O \qquad (I)$$

where x is typically 0.5 to 3. More specifically, the HF acid is added in an excess amount that is effective to form the insoluble $REF_3/FeF_3 \cdot xH_2O$ compound (precipitated salt) but that is ineffective (insufficient) to form soluble complex iron fluorides (e.g., iron oxyfluorides) and soluble iron fluorides. To this end, the HF acid is present from about a 5% to about a 25% excess of the stoichiometric amount necessary to hydrofluorination the oxides. In the Examples set forth below, the HF acid is present in about a 10 to 20% excess of the stoichiometric amount.

The invention is not limited to any particular concentration of HF acid solution. For example, from about 20 wt % to about 70 wt % aqueous HF solutions may be used in the invention to carry out the reaction (I) set forth above. Preferably, at least a 30 wt % to 60 wt % HF solution is used. A commercially available 48 wt % HF acid solution has been successfully employed in the method of the invention to carry out the reaction (I).

When the commercially available 48 wt % HF solution is employed to carry out reaction (I), the temperature of the reaction is maintained from about a minimum temperature of 100° C. to a maximum temperature of about 135° C. (boiling point of the 48 wt % HF solution). The reaction temperature can be conveniently controlled within the desired range by cooling the reaction vessel and/or by adding the HF acid solution in controlled/timed increments.

The reaction (I) yields an insoluble, hydrated rare earth/iron fluoride compound (precipitated salt) represented for convenience by the formula $REF_3/FEF_3 \cdot xH_2O$ wherein the $FeF_3$ is present in solid solution (e.g., ionically as $Fe^{+++}$ and $F^-$) in the $REF_3$ host crystal lattice. The "solid solution" nature of the fluoride compound is evidenced by the color of the fluoride compound in both the hydrated and dried forms vis-a-vis the color of the $RE_2O_3$ and $Fe_2O_3$ particulates and also by the X-ray diffraction pattern of the dried $REF_3/FeF_3$ compound vis-a-vis the X-ray diffraction patterns of dried $REF_3$ and dried $FeF_3$ as will be described in more detail below.

The hydrated fluoride compound ($REF_3/FeF_3 \cdot xH_2O$) is insoluble in the HF acid solution such that the precipitate thereof can be readily separated by well established decantation/filtering techniques. After separation, the hydrated fluoride compound is dried to powder cake form. In particular, the hydrated fluoride compound can be dried by heating in a stream of anhydrous hydrogen fluoride gas to a temperature of about 500° C. to 600° C. for a time to remove adhered water and water of hydration. Alternately, the hydrated fluoride compound can be dried by room temperature air drying for about 15 hours to remove adhering moisture and slowly drying to 500° C. to prevent pyrohydrolysis of the fluorides to the oxyfluoride or oxide form. The dried $REF_3/FeF_3$ compound typically contains only up to about 0.4 weight % of water, preferably less than about 0.2 weight % water.

Figure 3:
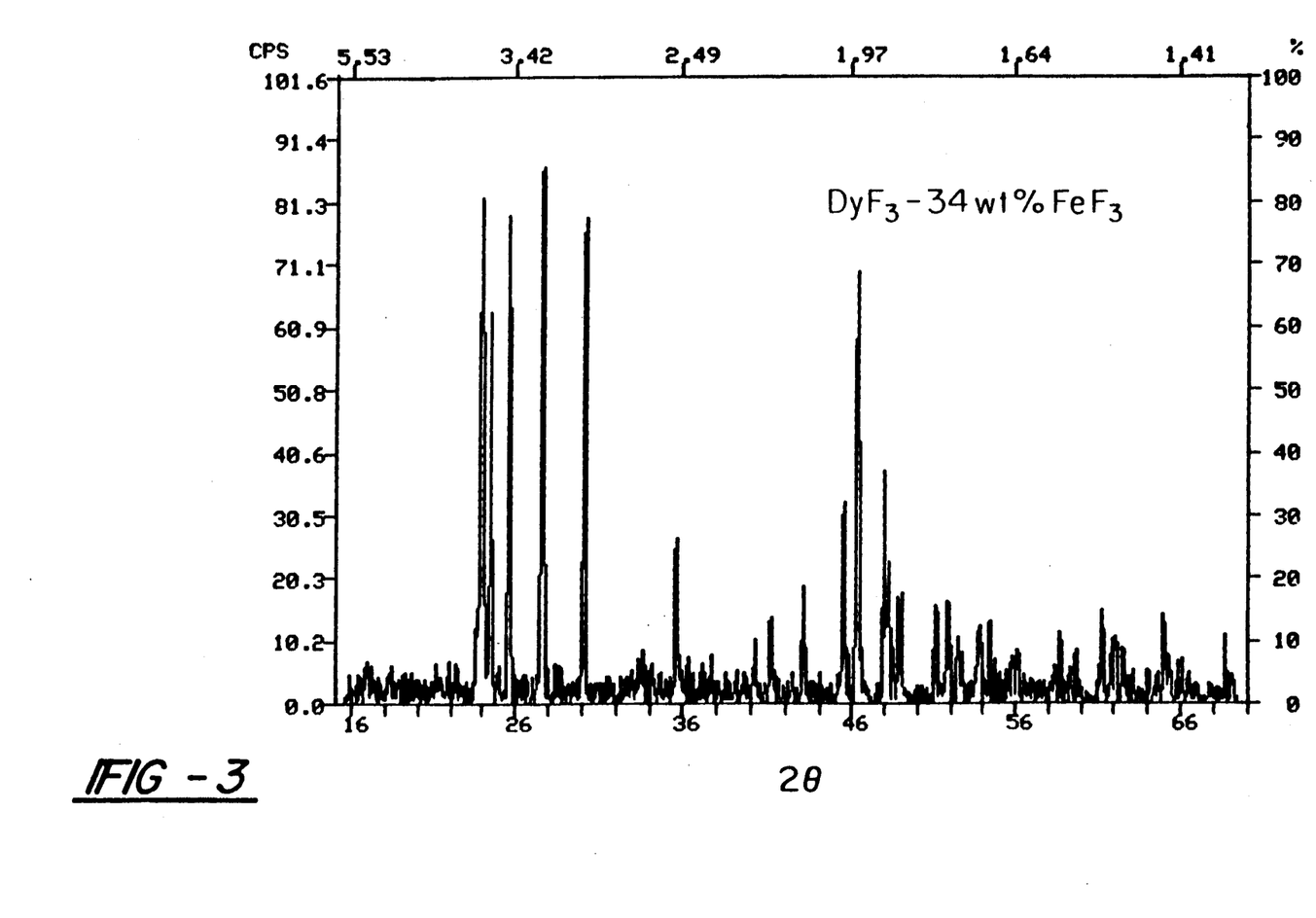
Figure 4:
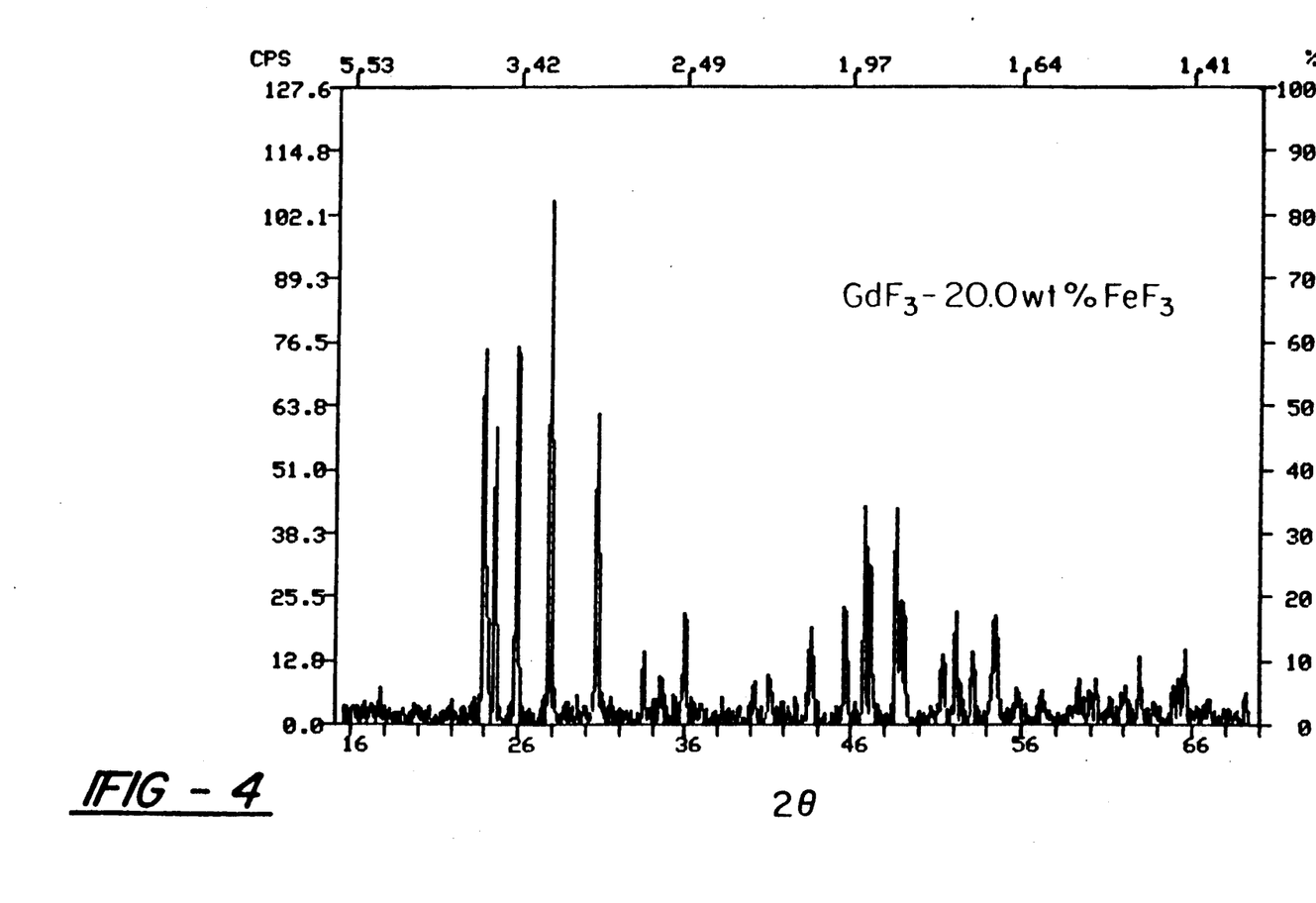
Figure 6:
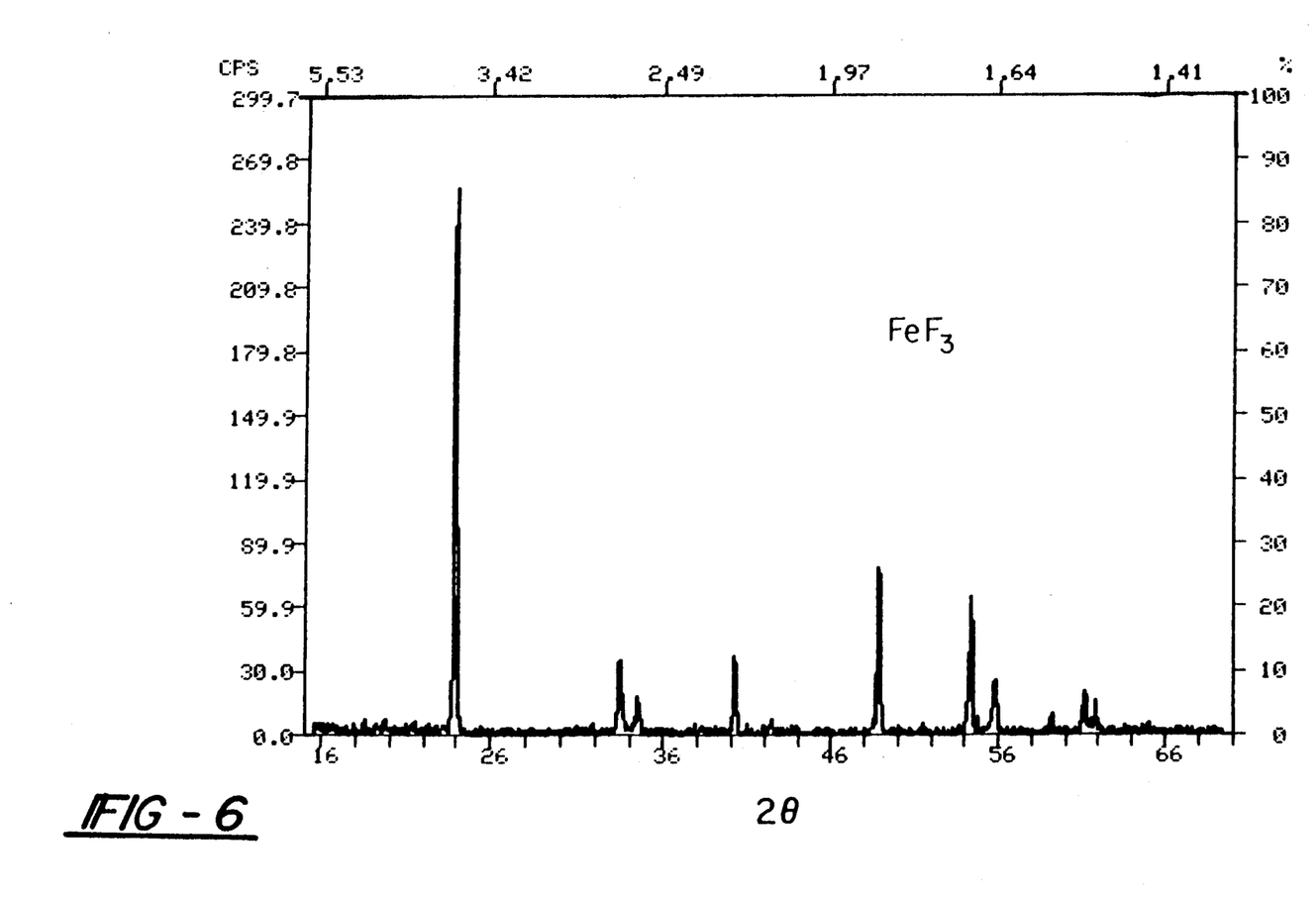
Figure 7:
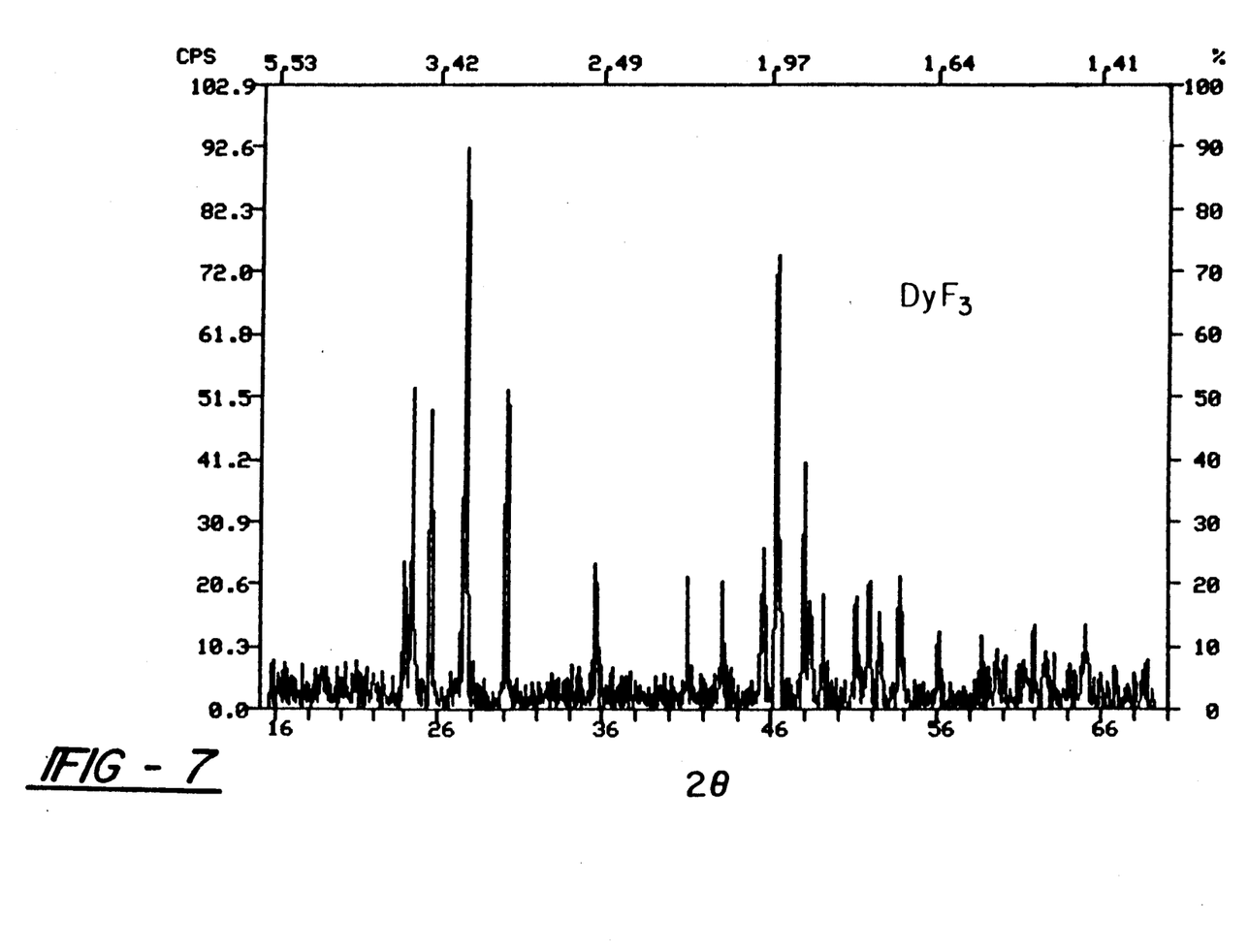
Figure 8:
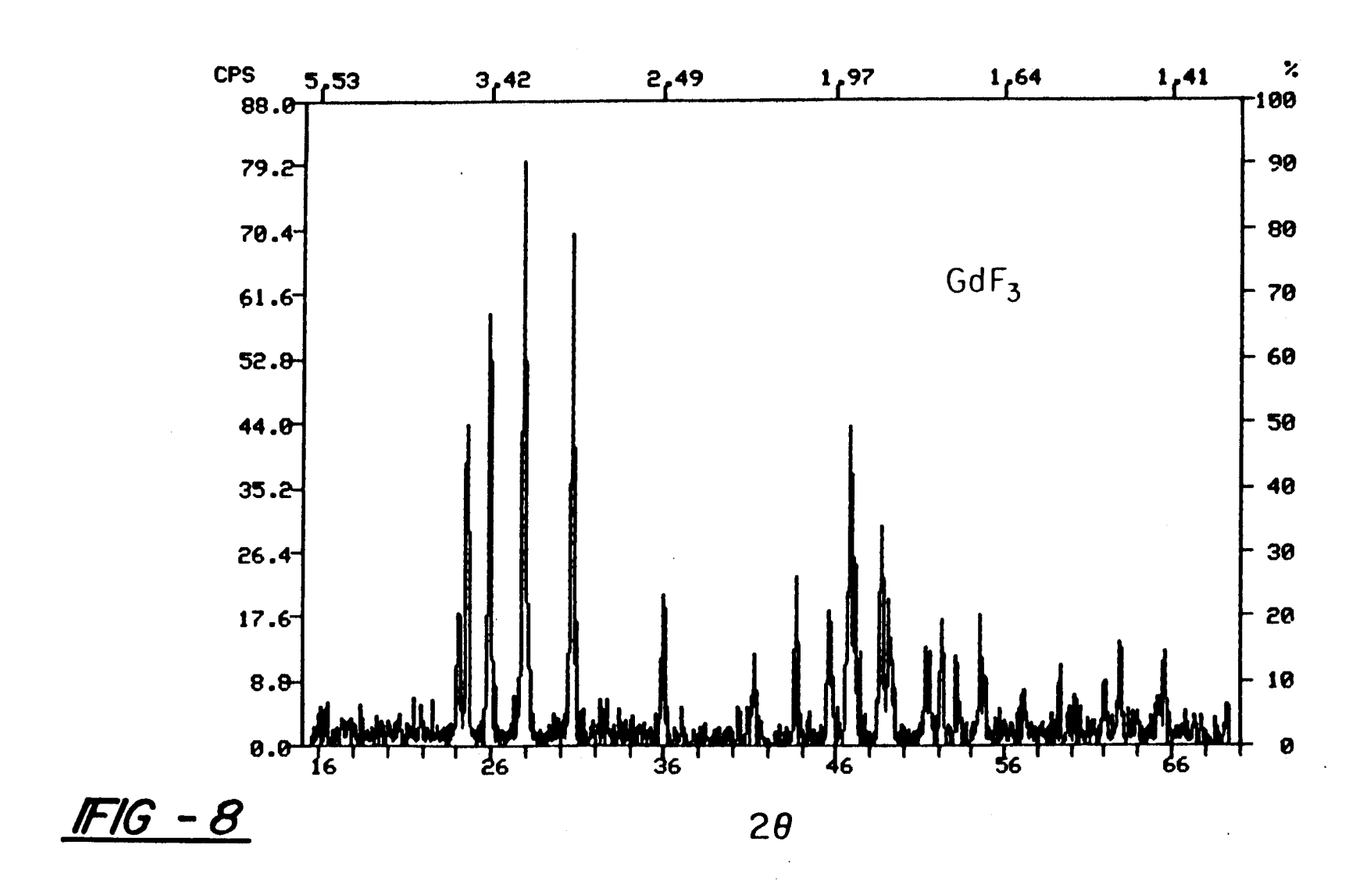

An X-ray diffraction pattern of the dried $REF_3/FeF_3$ compound corresponds substantially to the X-ray diffraction pattern of dried $REF_3$ compound with no indication of a pattern corresponding to $FeF_3$. For example, compare the X-ray diffraction pattern of FIG. 2 for the dried $NdF_3/FeF_3$ compound prepared in accordance with Example 1 with the diffractions patterns of dried $NdF_3$ (FIG. 5) and dried $FeF_3$ (FIG. 6). To this same end, also compare the X-ray diffraction pattern of the dried $DyF_3/FeF_3$ compound (FIG. 3) prepared in accordance with Example 2 versus the X-ray diffraction pattern of dried $DyF_3$ (FIG. 7) and the X-ray diffraction pattern of the dried $GdF_3/FeF_3$ compound (FIG. 4) prepared in accordance with Example 3 versus that of dried $GdF_3$ (FIG. 8).

These diffraction patterns indicate that the $FeF_3$ is present in solid solution (e.g., ionically as $Fe^{+++}$ and $F^-$) in the $REF_3$ host crystal lattice. Although the specific lattice positions occupied by the $FeF_3$ in the $REF_3$ host crystal lattice are not accurately known, the X-ray diffraction patterns of the dried fluoride compounds of the invention are nevertheless effective to indicate that the $FeF_3$ is present in solid solution in the $REF_3$ host crystal lattice and does not exist as a separate, distinct compound (which would exhibit its own distinct X-ray diffraction pattern).

The dried $REF_3/FeF_3$ fluoride compound of the invention is usable as a reactant in the thermite reduction process in lieu of the separate rare earth fluoride reactant and iron fluoride reactant (thermal booster) employed heretofore in practicing that process. For example, the $REF_3/FeF_3$ fluoride compound is mixed with a reducing metal (e.g., Ca) and the resulting reaction mixture is heated to a temperature to form an RE/Fe alloy in accordance with U.S. Pat. No. 4,612,047, the teachings of which are incorporated herein by reference. To this end, the dried $REF_3/FeF_3$ fluoride compound comprises about 5 weight % to about 40 weight %, preferably about 13 weight % to about 30 weight, % $FeF_3$ and the balance $REF_3$. However, the compound composition employed will depend on the particular rare earth/iron alloy to be prepared by the thermite reduction process. The composition of the rare earth/iron fluoride compound can be controlled by appropriate selection of the initial proportions of $Fe_2O_3$ and $RE_2O_3$ in the starting particulate mixture.

The $REF_3/FeF_3$ compound produced by the wet process described above provides a lower cost reactant for the thermite reduction process than was available heretofore. Moreover, use of this compound reduces the number of reactants which must be made and handled to carry out that process and also reduces the number of processing steps required to prepare the reactants. As a result, the overall cost of practicing the thermite reduction process to manufacture rare earth/iron alloys is reduced.

The following Examples are offered to illustrate the invention in further detail without limiting the scope thereof.

EXAMPLE 1

A starting particulate (powder) mixture was prepared by mixing 99 grams of $Nd_2O_3$ ($-30$ mesh) and 21 grams of $Fe_2O_3$ ($-30$ mesh) such that the mixture comprised about 17.5 weight % $Fe_2O_3$ and the balance $Nd_2O_3$. This starting powder mixture was placed in a Teflon beaker and 118 ml of 48 weight % aqueous HF acid solution were added and stirred with a plastic rod. The HF acid solution was added in a 10% excess of the stoichiometric amount necessary to hydrofluorinate the oxides without forming soluble Fe complex ions. The temperature of the resulting slurry was maintained at about 100° C. as the reaction (I) (set forth above) of the $Nd_2O_3/Fe_2O_3$ and the HF solution took place.

After the reaction was complete (e.g., after about 20 minutes), the insoluble, hydrated $NdF_3/FeF_3$ compound (precipitated salt) was separated by established decantation techniques and then dried by heating in a stream of anhydrous hydrogen fluoride gas at 500–600° C. for 4 hours. A dried $NdF_3/FeF_3$ compound in powder form was thereby produced. The dried $NdF_3/FeF_3$ compound comprised 56.46 weight % Nd, 10.69 weight % Fe and 33.15 weight % F. This analysis corresponds to an $NdF_3$-20.3 weight % $FeF_3$ compound.

X-ray diffraction patterns were made of this dried $NdF_3$-20.3 weight % $FeF_3$ compound and also of dried $NdF_3$ and dried $FeF_3$ for comparison purposes. The X-ray diffraction patterns were obtained by using a Scintag powder diffractometer and Cu K alpha radiation.

Figure 2:
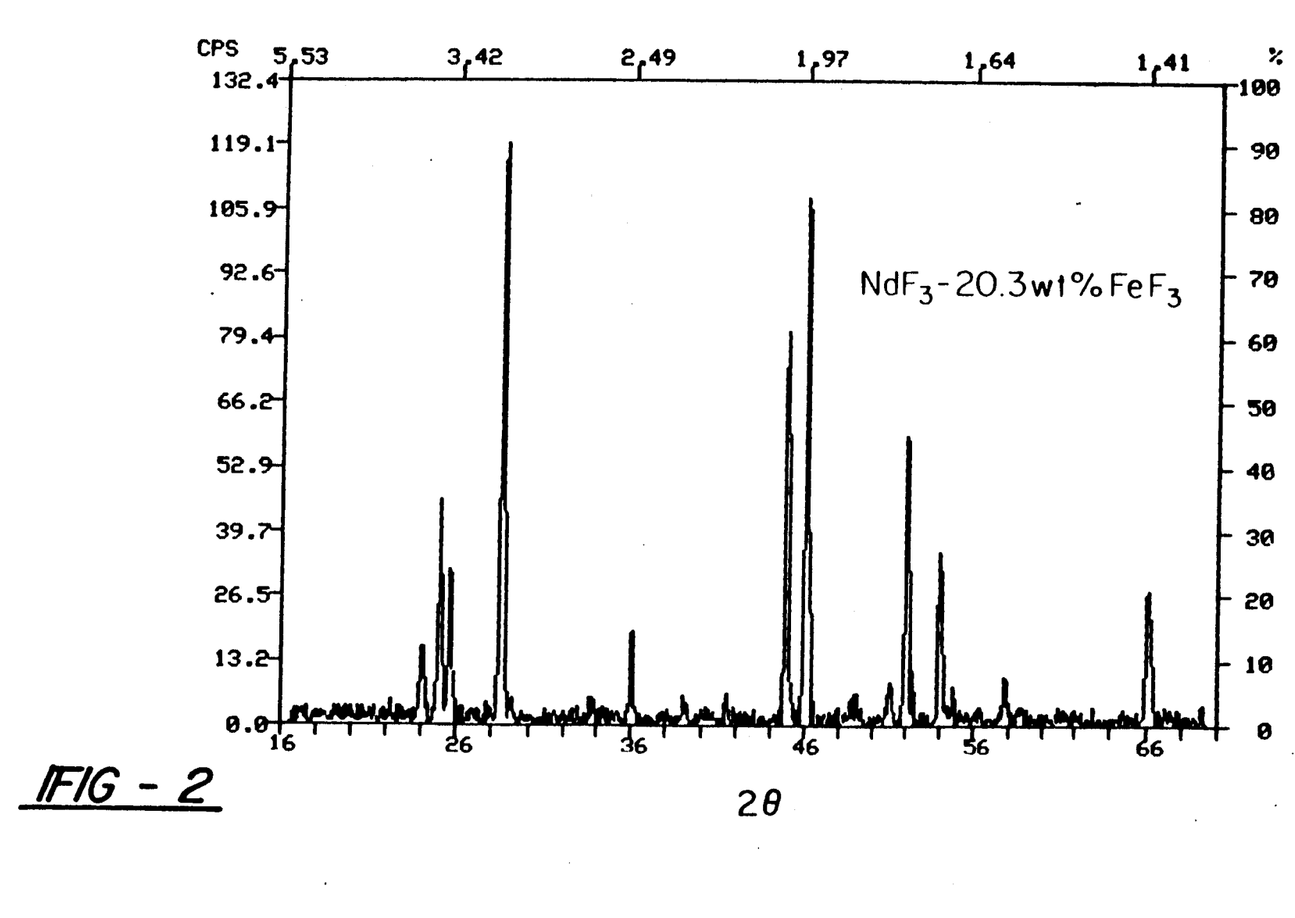
FIGS. 2, 3 and 4 are X-ray diffraction patterns of a $NdF_3/FeF_3$ compound, $DyF_3/FeF_3$ compound and $GdF_3/FeF_3$ compound in dried form prepared in accordance with Examples 1, 2 and 3, respectively.
Figure 5:
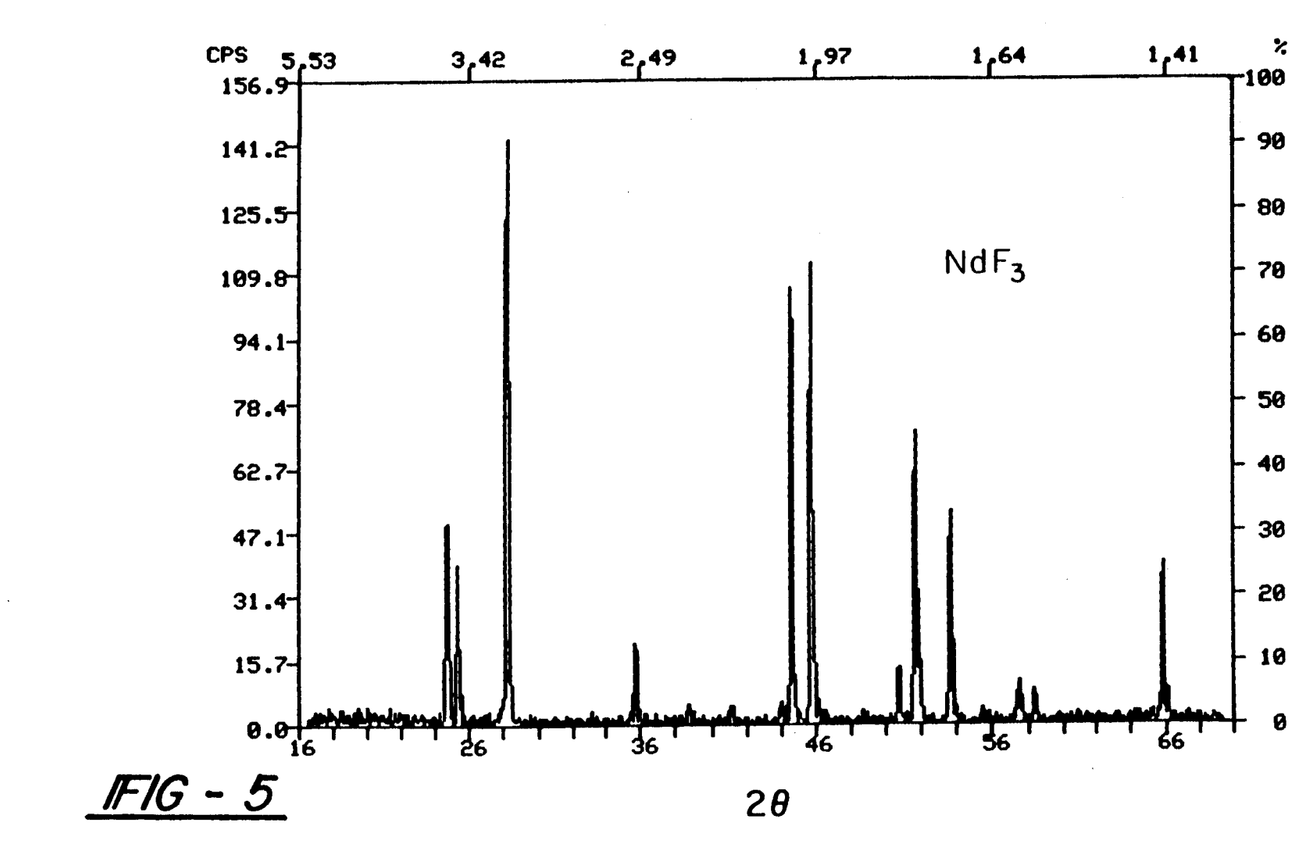
FIGS. 5, 6, 7 and 8 are X-ray diffraction patterns of dried $NdF_3$, $FeF_3$, $DyF_3$, and $GdF_3$, respectively, for comparison to the respective diffraction patterns of FIGS. 2, 3 and 4.

The diffraction pattern of the $NdF_3$-20.3 weight % $FeF_3$ compound corresponded substantially to that of the $NdF_3$, e.g., compare FIGS. 2 and 5. This correspondence indicated that the $FeF_3$ is present in solid solution (e.g., as $Fe^{+++}$ and $F^-$) in the $NdF_3$ host crystal lattice. In other words, at this particular concentration (i.e., 20.3 weight % $FeF_3$), the $FeF_3$ is not present as a separate, distinct compound.

The "solid solution" nature of the $NdF_3$-20.3 weight % $FeF_3$ compound in both the hydrated and dried forms is also confirmed by the pinkish color of the hydrated and dried compound as compared to the blue color of the $Nd_2O_3$ particulates and the barn red color of $Fe_2O_3$ particulates of the starting particulate mixture.

Approximately 5 kilograms of the dried $NdF_3$-20.3 weight % $FeF_3$ compound were prepared in the manner described above and employed as a reactant in the thermite reduction process (carried out in accordance with U.S. Pat. No. 4,612,047 with the exception that the dried $NdF_3$-20.3 weight % $FeF_3$ compound was used in lieu of the separate $NdF_3$ reactant and $FeF_3$ reactant described in the patent). Thermite reduction of the $NdF_3$-20.3 weight $FeF_3$ compound yielded a Nd-15 weight % Fe alloy.

EXAMPLE 2

A starting particulate (powder) mixture was prepared by mixing 100 grams of $Dy_2O_3$ ($-30$ mesh) and 42.8 grams of $Fe_2O_3$ ($-30$ mesh) such that the mixture comprised about 30 wt % $Fe_2O_3$ and the balance $Dy_2O_3$. The starting powder mixture was placed in a Teflon beaker and 160 ml of 48 weight % aqueous HF acid solution were added and stirred with a plastic rod. The HF acid solution was added in a 20% excess of the stoichiometric amount necessary to hydrofluorinate the oxides without forming soluble Fe complex ions. The temperature of the resulting slurry was about 110° C. as the reaction (I) of the $Dy_2O_3/Fe_2O_3$ and the HF solution took place. After the reaction was complete, the mixture was left to stand for about 2 hours after which time it was white in color. The insoluble, hydrated $DyF_3/FeF_3$ compound (precipitated salt) was separated by established decantation techniques and dried by heating in a stream of anhydrous hydrogen fluoride at 600° C. for about 6 hours. A dried $DyF_3$-34 wt % $FeF_3$ compound in powder form was thereby produced.

X-ray diffraction patterns were made of the dried $DyF_3$-34 wt % $FeF_3$ compound and also dried $DyF_3$ and dried $FeF_3$ for comparison purposes. The diffraction pattern of the $DyF_3$-34 wt % $FeF_3$ compound corresponded substantially to that of $DyF_3$, e.g., compare FIGS. 3 and 7. This correspondence indicated that the $FeF_3$ is present in solid solution in the $DyF_3$ host crystal lattice. In other words, at this particular concentration (i.e., 34 wt % $FeF_3$), the $FeF_3$ is not present as a separate, distinct compound.

EXAMPLE 3

A starting particulate (powder) mixture was prepared by mixing 100 grams of $Gd_2O_3$ ($-30$ mesh) and 20.9 grams of $Fe_2O_3$ ($-30$ mesh) such that the mixture comprised about 17 wt % $Fe_2O_3$ and the balance $Gd_2O_3$. The starting powder moisture was placed in a Teflon beaker and 122 ml of 48 wt % aqueous HF acid solution were added and stirred with a plastic rod. The HF solution was added in a 20% excess of the stoichiometric amount necessary to hydrofluorinate the oxides without forming soluble Fe complex ions. The temperature of the resulting slurry was about 110° C. as the reaction (I) of the $Gd_2O_3/Fe_2O_3$ and the HF took place. After the reaction was complete, the mixture was left to stand for about 2 hours after which time it was white in color. The insoluble, hydrated $GdF_3/FeF_3$ compound (precipitated salt) was separated by established decantation techniques and dried by heating in a stream of anhydrous hydrogen fluoride for about 6 hours at 600° C. A dried $GdF_3$-20.0 wt % $FeF_3$ compound in powder form was thereby produced.

X-ray diffraction patterns were made of the dried $GdF_3$-20.0 wt % $FeF_3$ compound and also dried $GdF_3$ and dried $FeF_3$ for comparison purposes. The diffraction pattern of the $GdF_3$-20.0 wt % $FeF_3$ compound corresponded substantially to that of $GdF_3$, e.g., compare FIGS. 4 and 8. This correspondence indicated that the $FeF_3$ is present in solid solution in the $GdF_3$ host crystal lattice. In other words, at this particular concentration (i.e., 20.0 wt % $FeF_3$), the $FeF_3$ is not present as a separate, distinct compound.

While the invention has been described in terms of specific embodiments thereof, it is not intended to be limited thereto but rather only to the extent set forth in the following claims.

What is claimed is:

1. A method of making a fluoride compound, comprising the steps of:
   a) preparing a particulate mixture of $Fe_2O_3$ and $RE_2O_3$ where RE is a rare earth element, and
   b) reacting the particulate mixture with HF acid in an amount exceeding the stoichiometric amount needed to hydrofluorinate the $Fe_2O_3$ and $RE_2O_3$, the excess amount of said HF acid being effective to yield an insoluble fluoride compound comprising $REF_3$ and $FeF_3$ present in solid solution in the $REF_3$ crystal lattice.

2. The method of claim 1 including the further step of drying said fluoride compound produced in step (b), the compound in dried form exhibiting an X-ray diffraction pattern corresponding substantially to that exhibited by $REF_3$.

3. The method of claim 1 wherein the particulate mixture comprises about 5 weight % to about 40 weight % $Fe_2O_3$ and the balance $RE_2O_3$.

4. The method of claim 3 wherein the particulate mixture comprises about 13 weight % to about 30 weight % $Fe_2O_3$ and the balance $RE_2O_3$.

5. The method of claim 1 wherein the HF acid is present in about 5% to about 25% excess of said stoichiometric amount.

6. The method of claim 5 wherein the HF acid is present in about a 10 to 20% excess of said stoichiometric amount.

7. The method of claim 1 wherein the HF acid comprises a 48 weight % HF aqueous solution.

8. The method of claim 7 wherein the particulate mixture is reacted with the HF solution at a reaction temperature up to about 135° C.

9. The method of claim 8 wherein the reaction temperature is maintained from about 100° C. to about 135° C.

10. The method of claim 1 wherein the particulate mixture is reacted with the HF acid by adding incremental amounts of the HF acid to a slurry of said mixture and said acid.

11. The method of claim 1 wherein the rare earth element is selected from the group consisting essentially of Nd, Dy, Gd, Ho, Er, Lu, La, Sc and Y.

12. In a thermite reduction process for making a rare earth/iron alloy, the steps of (a) forming a reaction mixture of a reducing metal and a fluoride compound comprising $REF_3$, where RE is a rare earth element, and $FeF_3$ present in solid solution in the $REF_3$ crystal lattice, said compound comprising about 5 weight % to about 40 weight % $FeF_3$ and the balance $REF_3$ and (b) heating the reaction mixture to a temperature to form an RE/Fe alloy.

13. The process of claim 12 wherein the rare earth element is selected from the group consisting essentially of Nd, Dy, Gd, Ho, Er, Lu, La, Sc and Y.

14. The process of claim 12 wherein the fluoride compound is made by
   1) preparing a particulate mixture of $Fe_2O_3$ and $RE_2O_3$ where RE is a rare earth element,
   2) reacting the particulate mixture with HF acid in an amount exceeding the stoichiometric amount needed to hydrofluorinate the $Fe_2O_3$ and $RE_2O_3$, the excess amount of said HF acid being effective to yield an insoluble fluoride compound comprising $REF_3$ and $FeF_3$ present in solid solution in the $REF_3$ crystal lattice, and
   3) drying the fluoride compound produced in step (2).

15. A fluoride compound comprising $REF_3$, where RE is a rare earth element, and $FeF_3$ present in solid solution in the $REF_3$ crystal lattice.

16. A fluoride compound comprising $REF_3$, where RE is a rare earth element, and $FeF_3$ present in solid solution in the $REF_3$ crystal lattice as indicated by an X-ray diffraction of said compound corresponding substantially to that exhibited by $REF_3$.

17. The compound of claim 15 comprising about 5 weight % to about 40 weight % $FeF_3$ and the balance $REF_3$.

18. The compound of claim 17 comprising 13 weight % to about 30 weight % $FeF_3$ and the balance $REF_3$.

19. The compound of claim 16 wherein the rare earth element is selected from the group consisting essentially of Nd, Dy, Gd, Ho, Er, Lu, La, Sc and Y.

20. A fluoride compound useful as a reactant in the thermite reduction process, comprising $NdF_3$ and $FeF_3$ present in solid solution in the $NdF_3$ crystal lattice as indicated by an X-ray diffraction pattern of said compound corresponding substantially to that exhibited by $NdF_3$, said compound comprising about 5 weight % to about 40 weight % $FeF_3$ and the balance $NdF_3$.

21. A fluoride compound useful as a reactant in the thermite reduction process, comprising $DyF_3$ and $FeF_3$ present in solid solution in the $DyF_3$ crystal lattice as indicated by an X-ray diffraction pattern of said compound corresponding substantially to that exhibited by $DyF_3$, said compound comprising about 5 weight % to about 40 weight % $FeF_3$ and the balance $DyF_3$.

22. A fluoride compound useful as a reactant in the thermite reduction process, comprising $GdF_3$ and $FeF_3$ present in solid solution in the $GdF_3$ crystal lattice as indicated by an X-ray diffraction pattern of said compound corresponding substantially to that exhibited by $GdF_3$, said compound comprising about 5 weight % to about 40 weight % $FeF_3$ and the balance $GdF_3$.

* * * * *